Aug. 28, 1956 W. W. J. BAUERSFELD 2,760,407
BEARING FOR TELESCOPE MIRROR
Filed Aug. 21, 1953
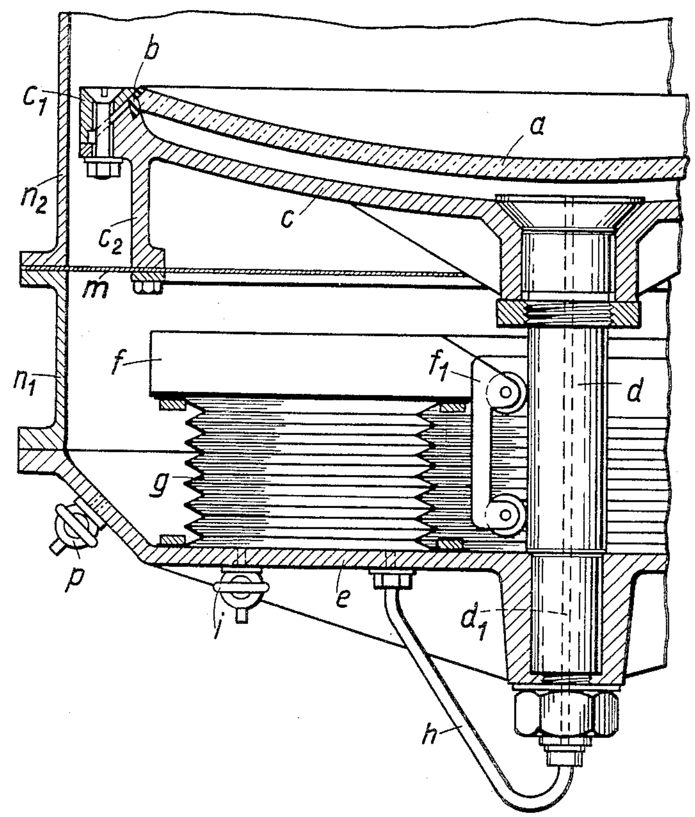

United States Patent Office 2,760,407

Patented Aug. 28, 1956

1

2,760,407

BEARING FOR TELESCOPE MIRROR

Walther Wilhelm Johannen Bauersfeld, Heidenheim (Brenz), Germany, assignor to Carl Zeiss, Heidenheim (Brenz), Germany Application August 21, 1953, Serial No. 375,781

Claims priority, application Germany August 28, 1952

2 Claims. (Cl. 88—73)

In the copending patent application Ser. No. 295,963, now Patent No. 2,736,231, a bearing for larger telescope mirrors has been disclosed whereby a fraction of the mirror thickness which up to now had been considered necessary will suffice without affecting the high accuracy of the mirror surface which is especially necessary for astronomic purposes. This is attained by embedding the mirror at the edge, air-tight and in its back leaving a hollow space which is closed toward the outside and whose internal pressure is self-adjusted by a weight loaded bellows-like construction forming a second hollow space which is connected with the first one so that for each position of the mirror in the space the weight component vertical to the mirror surface is neutralized. Thus, in spite of the reduced mirror thickness the form of the mirror surface is guaranteed unchanged at all times. Precondition for the correct working of this balance of weight is, that the forces bearing upon the mirror as a result of the rim gripping do not change i. e. the form of the mirror surface insured by the pure balance of weight is not subject to other influences as well. It is a known fact, on the other hand, that influences of temperature changes cannot always be avoided especially with astronomic telescopes, and, since the coefficients of thermal expansion of the construction materials used are not uniform, even the forces bearing upon the mirror edge can be somewhat changed and thus influence the form of the mirror surface to some degree.

The invention now shows a way to balance these influences as well and to render them harmless. For mirror bearings as in patent application Ser. No. 295,963 this is attained by arranging said bellows-like second hollow space in an airtight third hollow space and by providing means to produce a gas pressure in said third hollow space. The means to produce said gas pressure in the third hollow space may be connected with control means measuring the temperature of the air and regulating the pressure in said third hollow space as function of the measured temperature. Deformation of the mirror when the temperature is changing will be prevented by producing a gas pressure in the third hollow space, which pressure adds to the pressure caused by the weight of the bellows-like construction in the space behind the mirror. The added pressure may be a small over- or under-pressure compared to the outer air pressure. By suitable dimensioning and forming of this third space the changes of the internal forces of the mirror mount caused by temperature changes are influenced and balanced in that the gas in the third space produces in changing its temperature the desired pressure. It is especially practical to create the sealed space by connecting the mirror mount with the adjacent part of the telescope housing, which is usually closed toward the lower end, with a springy membrane which in spite of the tight sealing will create a limited possibility of movement for the internal balance of powers of the parts of the mount.

The judgment to what degree these opposing forces

2 actually bring about the correct form of the mirror surface will best be effected by checking the picture quality of the mirror, i. e. a star image imaged by the mirror is observed from which it is easy to ascertain in the known manner whether the mirror surface has the correct form. As far as influences by temperature changes are concerned a thermostat may be employed which, e. g., automatically governs the amount of the internal pressure as a function of the temperature. On the other hand, it is practical, independent of the above, to provide for a possibility to regulate internal pressure by hand in order to be in a position at any time and independent of the automatic adjustment to adjust the telescope to its highest picture quality. In this connection it is irrelevant whether the auxiliary means for the adjustment of the internal pressure are fixed to the telescope or whether they are set up fixedly and bear on the hollow space of the telescope through a suitable connecting device, e. g. a flexible hose line.

The drawing illustrates how the hollow space according to the invention can be created for the construction example of a mirror bearing described in the patent application (Ser. No. 295,963) now Patent No. 2,736,231. Just like in the said patent specification the drawing demonstrates a section along the mirror axis, of the mirror bearing for an astronomic telescope whreby the individual parts are designated by the same reference marks as in the said patent specification. Parts *a, b, c, d, e, f, g, h,* and *i* are approximately the same as in said patent specification. Mount body *c* of the mirror has, on its cylindriical attachment, an edge $c_2$ which is somewhat reinforced below, around which a thin steel plate ring *m* is tightly secured. On its outer side, steel plate ring *m* is situated between the flanges of two parts, $n_1$ and $n_2$, of the telescope casing and, together with parts *e* and $n_1$ of the telescope housing creates a tight sealing for the space between mirror mount *c* and ground plate *e*, in which balancing weight *f* with bellows *g* is also situated. By means of a stop valve *p* which is inserted in ground plate *e*, air may be sucked off, or compressed air inserted as required so that at any time necessary corrections of the internal powers of the mount may be possible. Also, valve *p* may be attached to a lead which is connected to a device automatically adjusting the internal pressure by means of a thermostat.

I claim:

1. In a mounting device for plane or curved telescope mirrors of large diameter comprising a mounting body having an annular marginal bearing surface, means for tightly embedding said mirror at all its marginal points with said annular surface such as to form between the rear mirror surface and said mounting body surface adjacent said rear mirror surface a hollow space being shut off from the outside in pressure tight fashion and filled with a gas, a second hollow space of bellows-like form connected to said mounting body and having a movable cover plate and a weight body connected to said cover plate, means for practically frictionless guiding of said weight body parallel to the said mirror axis and means for interconnecting said second hollow space with said first hollow space, a third air-tight hollow space in which said bellows-like second hollow space is arranged and means to produce a gas pressure in said third hollow space.

2. Mounting device for telescope mirrors as in claim 1, characterized in that said mounting body for the telescope mirror is connected with the telescope housing by a springy membrane.

References Cited in the file of this patent

UNITED STATES PATENTS 2,555,387 Zobel ------------------ June 5, 1951